US012168939B1

United States Patent
Wood et al.

(10) Patent No.: US 12,168,939 B1
(45) Date of Patent: Dec. 17, 2024

(54) RADIAL TURBINE ASSEMBLY WITH INTERMEDIATE BLADE BONDING RING

(71) Applicant: Rolls-Royce North American Technologies Inc., Indianapolis, IN (US)

(72) Inventors: Michael D. Wood, Indianapolis, IN (US); Matthew T. Kush, Indianapolis, IN (US); Timothy P. Fuesting, Indianapolis, IN (US); Douglas D. Dierksmeier, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/371,840

(22) Filed: Sep. 22, 2023

(51) Int. Cl.
*F01D 5/04* (2006.01)
*B23K 1/00* (2006.01)
*F01D 5/30* (2006.01)

(52) U.S. Cl.
CPC .......... *F01D 5/3061* (2013.01); *B23K 1/0018* (2013.01); *F01D 5/04* (2013.01); *F05D 2220/30* (2013.01); *F05D 2230/237* (2013.01); *F05D 2240/24* (2013.01)

(58) Field of Classification Search
CPC . F01D 5/04; F01D 5/041; F01D 5/043; F01D 5/045; F01D 5/048; F05D 2220/30; F05D 2230/237; F05D 2240/24; B23K 1/008
See application file for complete search history.

(56) References Cited

U.S. PATENT DOCUMENTS

| | | | |
|---|---|---|---|
| 9,476,305 B2 | 10/2016 | Jan | |
| 9,726,022 B2 | 8/2017 | Mittendorf | |
| 9,850,760 B2 | 12/2017 | Crosatti | |
| 10,280,768 B2 | 5/2019 | Freeman | |
| 11,506,060 B1 | 11/2022 | Kurlak | |
| 2013/0272882 A1 | 10/2013 | Mittendorf | |
| 2013/0280036 A1 | 10/2013 | Jan | |
| 2016/0305249 A1 | 10/2016 | Crosatti | |
| 2017/0022827 A1* | 1/2017 | Waldman | F01D 5/082 |
| 2017/0254209 A1 | 9/2017 | Smoke | |
| 2018/0128109 A1* | 5/2018 | Humes | F01D 5/048 |
| 2018/0156046 A1* | 6/2018 | Ahmad | F01D 5/147 |

* cited by examiner

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A multi-piece radial turbine rotor includes a hub, turbine blades, and an intermediate ring that couples the turbine blades to the hub. Joints between the components of the rotor are adapted for inspection during manufacture to identify potential defects in the joints.

18 Claims, 3 Drawing Sheets

RADIAL TURBINE ASSEMBLY WITH INTERMEDIATE BLADE BONDING RING

FIELD OF THE DISCLOSURE

The present disclosure relates generally to radial turbines, and more specifically to radial turbine rotors.

BACKGROUND

Radial turbine rotors are characterized by rotating in response to a flow of working fluid radially inwardly toward the axis of rotation. In many applications, radial turbine rotors can be more efficient than axial turbine rotors that rotate in response to a flow of working fluid primarily parallel to the axis of rotation.

To increase efficiency of radial turbine rotors, it can be beneficial to increase the temperature of the working fluid that interacts with the rotors. However, manufacturing radial turbine rotors from high temperature materials and/or incorporating an active supply of cooling air into radial turbines presents challenges.

SUMMARY

The present disclosure may comprise one or more of the following features and combinations thereof in an effort to address challenges in radial turbine rotor design and manufacture.

A radial turbine rotor may comprise a hub, a plurality of turbine blades, and an intermediate ring. The hub may be arranged around a central axis that defines a radially-innermost surface of the rotor. The plurality of turbine blades may be located circumferentially outward of the hub. Each of the plurality of turbine blades may be formed to include a platform portion and an airfoil portion radially outward of the platform portion. The intermediate ring may extend around the central axis and may be coupled with the hub and each of the plurality of turbine blades to locate the intermediate ring radially between the hub and each of the plurality of turbine blades. The hub may be fixed to the intermediate ring by a diffusion bond joint formed between a radially-outwardly facing surface of the hub and a radially-inwardly facing surface of the intermediate ring.

In some embodiments, each of the plurality of turbine blades may be fixed to the intermediate ring by a blade joint formed between a radially-inwardly facing surface of the platform portion of each of the plurality of turbine blades and the intermediate ring. The blade joint may be a braze joint.

In some embodiments, a radially-outwardly facing surface of the intermediate ring may be substantially unblemished. The blade joint may be formed between the radially-inwardly facing surface of the platform portion of each of the plurality of turbine blades and the radially-outwardly facing surface of the intermediate ring.

In some embodiments, the radially-outwardly facing surface of the intermediate ring and the radially-inwardly facing surface of the platform portion of each of the plurality of turbine blades may have matching surface contours. The intermediate ring may be formed to include a plurality of protrusions extending radially outward from a radially-outwardly facing surface of the intermediate ring and axially along the radially-outwardly facing surface between a forward end of the intermediate ring and an aft end of the intermediate ring.

In some embodiments, the plurality of protrusions may be formed circumferentially around an entirety of the intermediate ring. The blade joint may be formed between the radially-inwardly facing surface of the platform portion of each of the plurality of turbine blades and a radially-outwardly facing surface of each of the plurality of protrusions. The radially-inwardly facing surface of the platform portion of each of the plurality of turbine blades may be substantially flat and a radially-outwardly facing surface of each of the plurality of protrusions may be substantially flat. A number of the plurality of turbine blades and a number of the plurality of protrusions may be equal.

A method of assembling a radial turbine rotor may comprise manufacturing a plurality of turbine blades. Each of the plurality of turbine blades may be formed to include a platform portion and an airfoil portion extending radially outward from the platform portion. The method may comprise manufacturing an intermediate ring that extends circumferentially about a central axis. The method may comprise manufacturing a hub that extends circumferentially about the central axis. The method may comprise fixing a radially-inwardly facing surface of the platform portion of each of the plurality of turbine blades to the intermediate ring by a blade joint to locate the plurality of turbine blades radially outward of the intermediate ring. The method may comprise fixing a radially-inwardly facing surface of the intermediate ring to a radially-outwardly facing surface of the hub by a hub joint to locate the hub radially inward of the intermediate ring.

In some embodiments, the blade joint may be a braze joint. A radially-outwardly facing surface of the intermediate ring may be substantially unblemished. The step of fixing the radially-inwardly facing surface of the platform portion of each of the plurality of turbine blades to the intermediate ring by a blade joint may include fixing the radially-inwardly facing surface of the platform portion of each of the plurality of turbine blades to the radially-outwardly facing surface of the intermediate ring.

In some embodiments, the method may comprise machining the radially-outwardly facing surface of the intermediate ring and the radially-inwardly facing surface of the platform portion of each of the plurality of turbine blades to have matching surface contours. The intermediate ring may be formed to include a plurality of protrusions extending radially outward from a radially-outwardly facing surface of the intermediate ring and axially along the radially-outwardly facing surface between a forward end of the intermediate ring and an aft end of the intermediate ring.

In some embodiments, the step of fixing the radially-inwardly facing surface of the platform portion of each of the plurality of turbine blades to the intermediate ring by a blade joint may include fixing the radially-inwardly facing surface of the platform portion of each of the plurality of turbine blades to a radially-outwardly facing surface of each of the plurality of protrusions. The method may comprise machining the radially-outwardly facing surface of each of the plurality of protrusions and the radially-inwardly facing surface of the platform portion of each of the plurality of turbine blades to form matching flat surfaces.

In some embodiments, the plurality of protrusions may be formed circumferentially around an entirety of the intermediate ring. A number of the plurality of turbine blades and a number of the plurality of protrusions may be equal. The method may comprise machining the radially-inwardly facing surface of the intermediate ring and the radially-outwardly facing surface of the hub to form matching conical surfaces.

These and other features of the present disclosure will become more apparent from the following description of the illustrative embodiments.

DETAILED DESCRIPTION OF THE DRAWINGS

Figure 1:
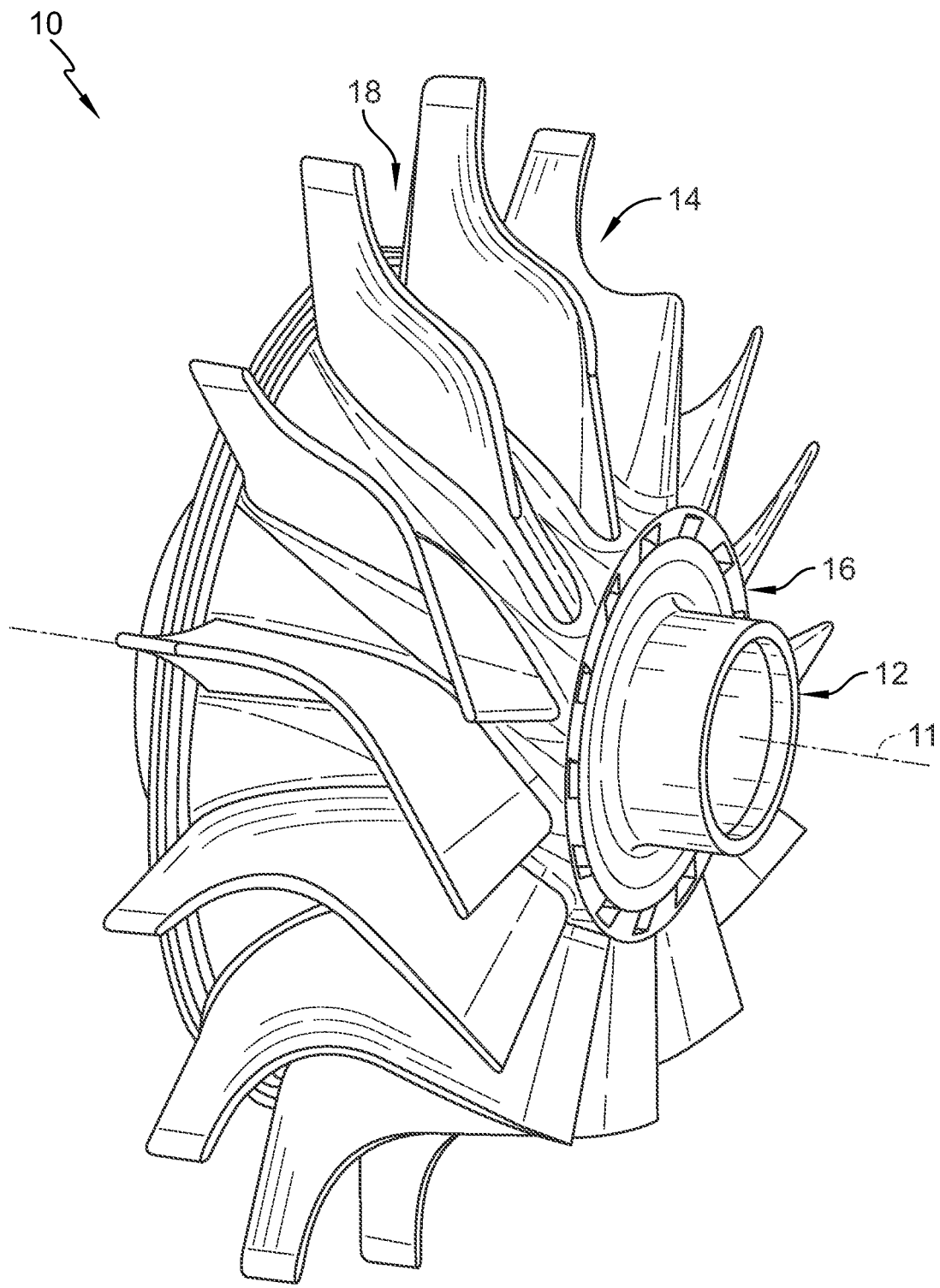
FIG. 1 is a perspective view of a radial turbine rotor assembled from a number of different pieces.

For the purposes of promoting an understanding of the principles of the disclosure, reference will now be made to a number of illustrative embodiments illustrated in the drawings and specific language will be used to describe the same.

A radial turbine rotor 10 for use in a gas turbine engine includes a hub 12, a plurality of turbine blades 14, and an intermediate ring 16 as shown in FIG. 1. The intermediate ring 16 provides a relatively thin component through which non-destructive test signals can pass allowing for improved evaluation of connections to the ring 16.

The radial turbine rotor 10 is configured to extract energy from a working fluid, such as hot, high pressure combustion products, flowing through a gas path 18. The radial turbine rotor 10 rotates about a central axis 11 to extract mechanical work from the flow of working fluid to drive other components of the gas turbine engine. The flow of working fluid in the radial turbine rotor 10 may be radial to the central axis 11.

Conventional manufacturing methods for turbines utilize integrally cast turbine blades and hub. However, these conventional manufacturing methods may not be cost effective for radial turbines with very complex geometries, integrated cooling passages, and/or comprising hard-to-machine materials. For example, if one turbine blade of an integrally cast radial turbine has a defect, the entire radial turbine may be unusable. A low casting yield in production due to potential defects may lead to increased costs.

Figure 3:
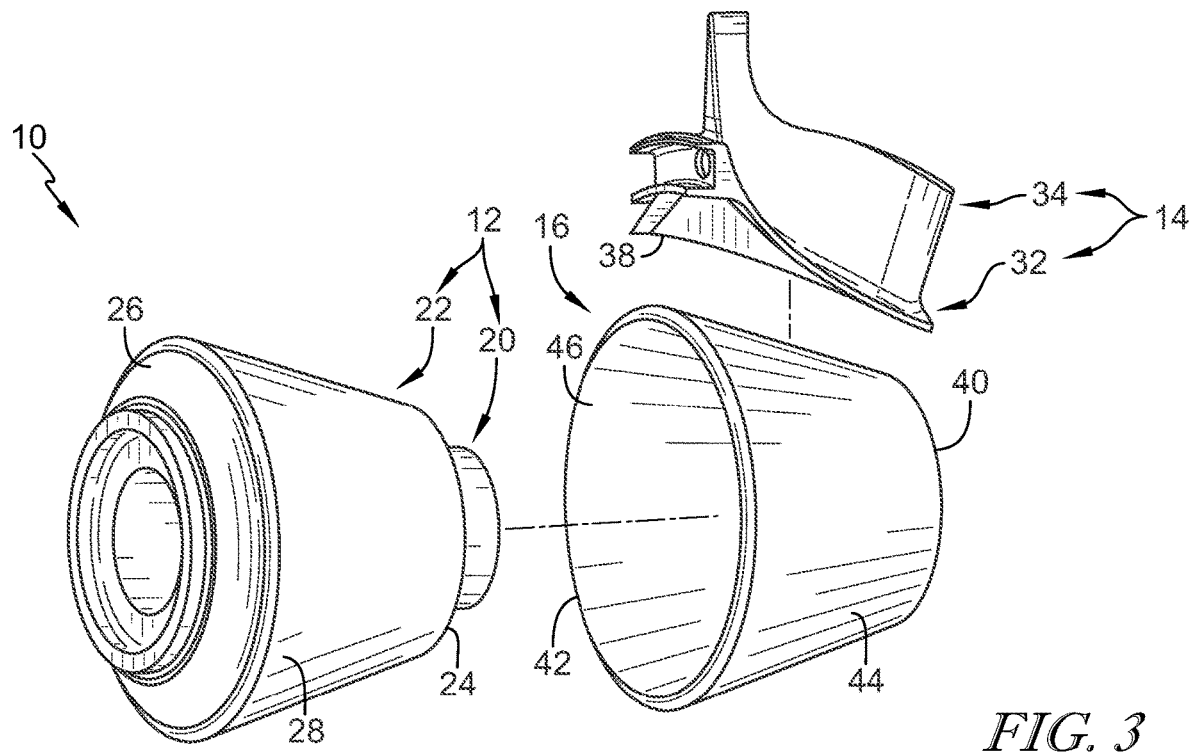
FIG. 3 is an exploded perspective assembly view of the radial turbine rotor from FIG. 1 showing that the intermediate ring is shaped to receive the hub inward of the intermediate ring to locate the intermediate ring between the turbine blade and the hub, and further showing that a radially-outwardly facing surface of the intermediate ring is substantially unblemished.

The radial turbine rotor 10 includes the hub 12, the plurality of turbine blades 14, and the intermediate ring 16, which are separate components that are assembled to form the radial turbine rotor 10 as suggested in FIG. 3. The multi-piece radial turbine rotor 10 allows for inspection of each component prior to assembly of the radial turbine rotor 10 so that the entire radial turbine rotor 10 may not be deemed unusable due to a defect in one component. Each component (i.e., the hub 12, each of the plurality of turbine blades 14, and the intermediate ring 16) may be inspected for defects prior to coupling the components together, and defective components may be discarded.

The hub 12 is arranged around the central axis 11 as shown in FIG. 1. As assembled, the hub 12 defines a radially-innermost surface of the radial turbine rotor 10. In the illustrative embodiment, the hub 12 includes a cylindrical portion 20 and a conical portion 22. The conical portion 22 of the hub 12 extends between a first end 24 and a second end 26. The first end 24 has a first diameter, and the second end 26 has a second diameter. The first diameter is smaller than the second diameter. The first end 24 of the conical portion 22 is coupled with the cylindrical portion 20 of the hub 12.

In some embodiments, the hub 12 comprises nickel superalloy, such as, but not limited to, Udimet 720. In some embodiments, the hub 12 comprises nickel powder alloy, such as, but not limited to, RR1000. In some embodiments, the hub 12 comprises polycrystalline nickel-based superalloy, such as, but not limited to, Mar-M-247. In the illustrative embodiment, the hub 12 is integrally formed as a single component.

Figure 2:
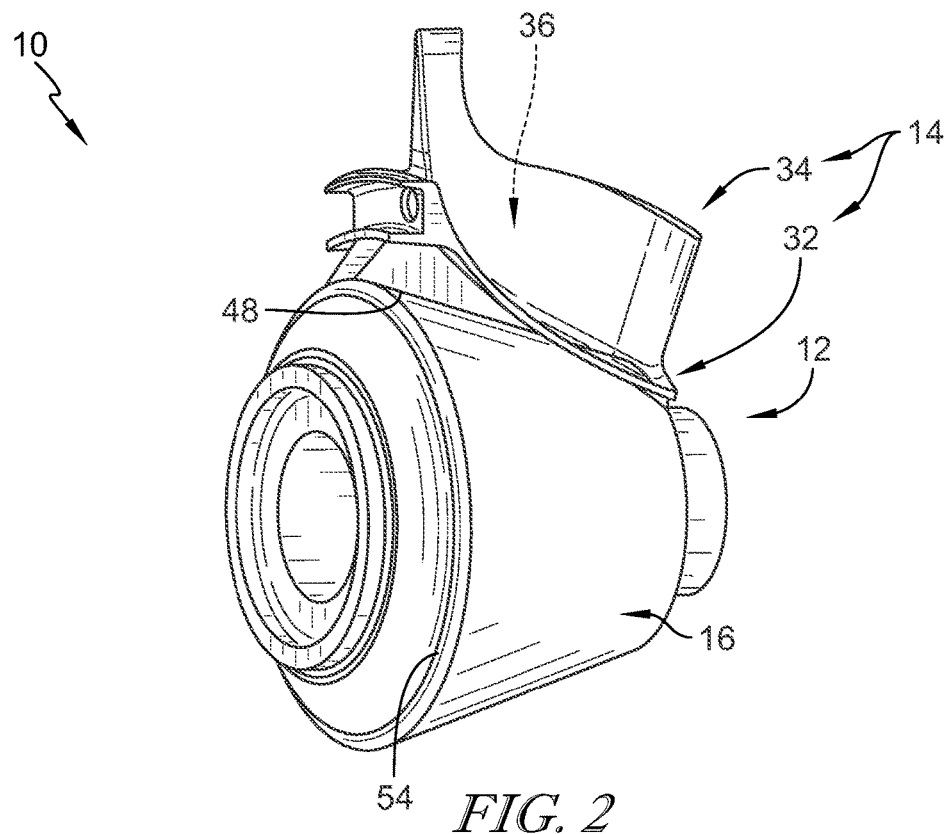
FIG. 2 is a perspective view of the radial turbine rotor from FIG. 1 showing that the rotor includes a hub, a turbine blade, and an intermediate ring located radially between the hub and the turbine blade, and further showing the turbine blade includes a platform portion coupled with the intermediate ring and an airfoil portion extending radially outwardly from the platform portion into a gas path.

The plurality of turbine blades 14 are located radially outward of the hub 12 as shown in FIGS. 1 and 2. The plurality of turbine blades 14 are circumferentially spaced apart from one another about the central axis 11. Each of the plurality of turbine blades 14 includes a platform portion 32 and an airfoil portion 34 located radially outward of the platform portion 32. Once assembled, the platform portion 32 of each of the plurality of turbine blades 14 is adjacent the intermediate ring 16, and the airfoil portion 34 of each of the plurality of turbine blades 14 extends radially outward into the gas path 18.

The platform portion 32 of each of the plurality of turbine blades 14 includes a radially-inwardly facing surface 38 as shown in FIG. 3. The radially-inwardly facing surface 38 is machined so that it is substantially smooth and unblemished. The radially-inwardly facing surface 38 is generally free of protrusions or deposits of material. The substantially smooth radially-inwardly facing surface 38 allows for easier inspection of each of the plurality of turbine blades 14 prior to assembly of the radial turbine rotor 10.

At least one turbine blade 14 of the plurality of turbine blades 14 is formed to include a cooling air passageway 36 extending therethrough, as shown in FIG. 2, to cool the turbine blade 14 that is exposed to the hot working fluid flowing through the gas path 18. Cooling air travels radially outward from the hub 12 into the cooling air passageway 36 of the turbine blade 14. In some embodiments, each of the plurality of turbine blades 14 is cooled.

In some embodiments, each of the plurality of turbine blades 14 comprises metallic materials. For example, each of the plurality of turbine blades 14 may comprise polycrystalline nickel-based superalloy, such as, but not limited to, Mar-M-247. In some examples, each of the plurality of turbine blades 14 comprises directionally solidified alloys, such as, but not limited to, CM186LC. In some examples, each of the plurality of turbine blades 14 comprises single crystal alloys, such as, but not limited to CMSX-3 or CMSX-4. In some embodiments, each of the plurality of turbine blades 14 may be forged or cast. In some embodiments, each of the plurality of turbine blades 14 may be made through additive manufacturing and may comprise, for example, Haynes 282 alloy. In some embodiments, each of the plurality of turbine blades 14 may be made through additive manufacturing and may comprise a high temperature alloy. In some examples, each of the plurality of turbine blades 14 may be made through metal injection molding and may comprise, for example, Mar-M-247. In the illustrative embodiment, each of the plurality of turbine blades 14 is integrally formed as a single component.

The intermediate ring 16 extends circumferentially about the central axis 11 as shown in FIG. 1. In the illustrative embodiment, the intermediate ring 16 is integrally formed as a single component. In some embodiments, the intermediate ring 16 comprises nickel superalloy, such as, but not limited to, Udimet 720. In some embodiments, the intermediate ring 16 comprises nickel powder alloy, such as, but not limited to, RR1000. In some embodiments, the intermediate ring 16 comprises polycrystalline nickel-based superalloy, such as, but not limited to, Mar-M-247.

As assembled, the intermediate ring 16 is located radially between the hub 12 and the plurality of turbine blades 14 as shown in FIG. 1. The intermediate ring 16 includes a first end 40 and a second end 42 opposite the first end 40. The first end 40 of the intermediate ring 16 is located adjacent the first end 24 of the conical portion 22 of the hub 12, and the second end 42 of the intermediate ring 16 is located adjacent the second end 26 of the conical portion 22 of the hub 12.

A radially-outwardly facing surface 44 of the intermediate ring 16 extends between the first end 40 and the second end 42 of the intermediate ring 16 as shown in FIG. 3. The radially-outwardly facing surface 44 is machined so that it is substantially smooth and unblemished. The radially-outwardly facing surface 44 is generally free of protrusions or deposits of material. The radially-inwardly facing surface 38 of the platform portion 32 of each of the plurality of turbine blades 14 and the radially-outwardly facing surface 44 of the intermediate ring 16 have matching surface contours. The matching surface contours may be achieved through machining of both surfaces 38, 44.

Each of the plurality of turbine blades 14 is coupled with the radially-outwardly facing surface 44 of the intermediate ring 16 as shown in FIG. 1. The platform portion 32 of adjacent turbine blades 14 abut one another once fixed with the intermediate ring 16. The platform portion 32 of each of the plurality of turbine blades 14 extends from the first end 40 of the intermediate ring 16 to the second end 42 of the intermediate ring 16.

Each turbine blade 14 is fixed to the intermediate ring 16 by a blade joint 48 between the radially-inwardly facing surface 38 of the platform portion 32 of the turbine blade 14 and the radially-outwardly facing surface 44 of the intermediate ring 16 as shown in FIG. 2. In some embodiments, the blade joint 48 is a diffusion bond joint. In some embodiments, the blade joint 48 is a braze joint. In some embodiments, the blade joint 48 may be any other joint that fixes the platform portion 32 of the turbine blade 14 with the intermediate ring 16. The matching surface contours of the surfaces 38, 44 allow for a strong blade joint 48 to be formed.

The intermediate ring 16 (as opposed to forming a joint between each of the plurality of turbine blades 14 and the hub 12 directly) allows for potentially improved inspection of the blade joint 48 using non-destructive inspection methods. The blade joint 48 may be inspected to determine if the blade joint 48 has been sufficiently formed between each turbine blade 14 and the intermediate ring 16. Various inspection tools may be used to assess the quality of the blade joint 48, such as, but not limited to, an ultrasonic transducer, a magnification device, an eddy current sensor, and/or a flash thermography device.

The hub 12 fits within the intermediate ring 16 such that the conical portion 22 of the hub 12 is located radially inward of the intermediate ring 16 as suggested in FIG. 3. As assembled, the hub 12 is located radially inward of the intermediate ring 16. The radially-outwardly facing surface 28 of the conical portion 22 of the hub 12 and a radially-inwardly facing surface 46 of the intermediate ring 16 have matching conical surfaces so that the hub 12 and the intermediate ring 16 may be fixed together. The matching conical surfaces may be achieved through machining of both surfaces 28, 46.

The hub 12 is fixed to the intermediate ring 16 by a hub joint 54 as shown in FIG. 2. The hub joint 54 is formed between the radially-outwardly facing surface 28 of the conical portion 22 of the hub 12 and the radially-inwardly facing surface 46 of the intermediate ring 16. In the illustrative embodiment, the hub joint 54 is a diffusion bond joint. In some embodiments, the hub joint 54 may be any other joint that fixes the hub 12 with the intermediate ring 16. The matching conical surfaces 28, 46 allow for a strong hub joint 54 to be formed.

In some embodiments, shrink fitting may be used as part of the process of forming the hub joint 54. A material containing a suitable melting point suppressant may be applied to the radially-outwardly facing surface 28 of the hub 12 and/or the radially-inwardly facing surface 46 of the intermediate ring 16. The hub 12 and the intermediate ring 16 may be shrink fit together by sufficiently heating the intermediate ring 16 and cooling the hub 12, resulting in thermal expansion of the intermediate ring 16. After the intermediate ring 16 has expanded, the hub 12 may be inserted into the intermediate ring 16. As the intermediate ring 16 and the hub 12 reach ambient temperature, the hub joint 54 may then be formed through, for example, diffusion bonding.

The hub joint 54 may be inspected to determine if the hub joint 54 has been sufficiently formed between the intermediate ring 16 and the hub 12. Various inspection tools may be used to assess the quality of the hub joint 54, such as, but not limited to, an ultrasonic transducer, a magnification device, an eddy current sensor, and/or a flash thermography device.

Figure 4:
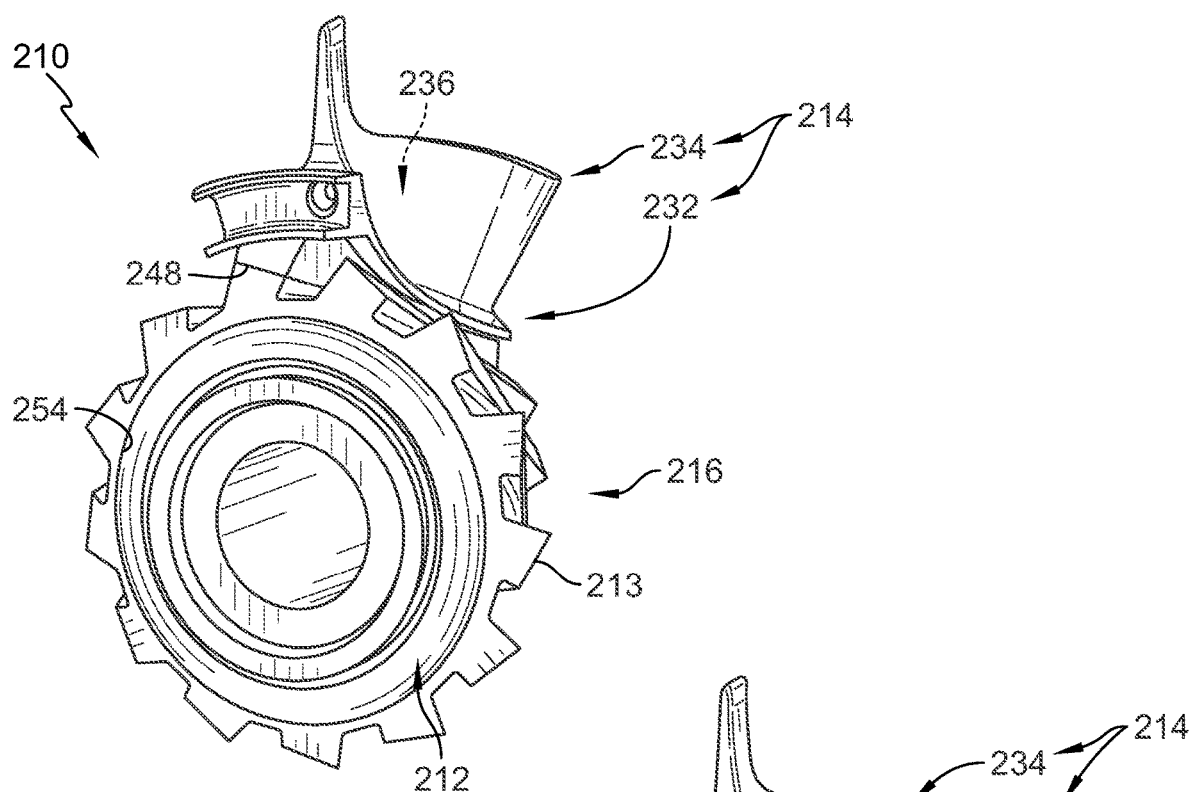
FIG. 4 is a perspective view of another radial turbine rotor assembled from a number of different pieces.
Figure 5:
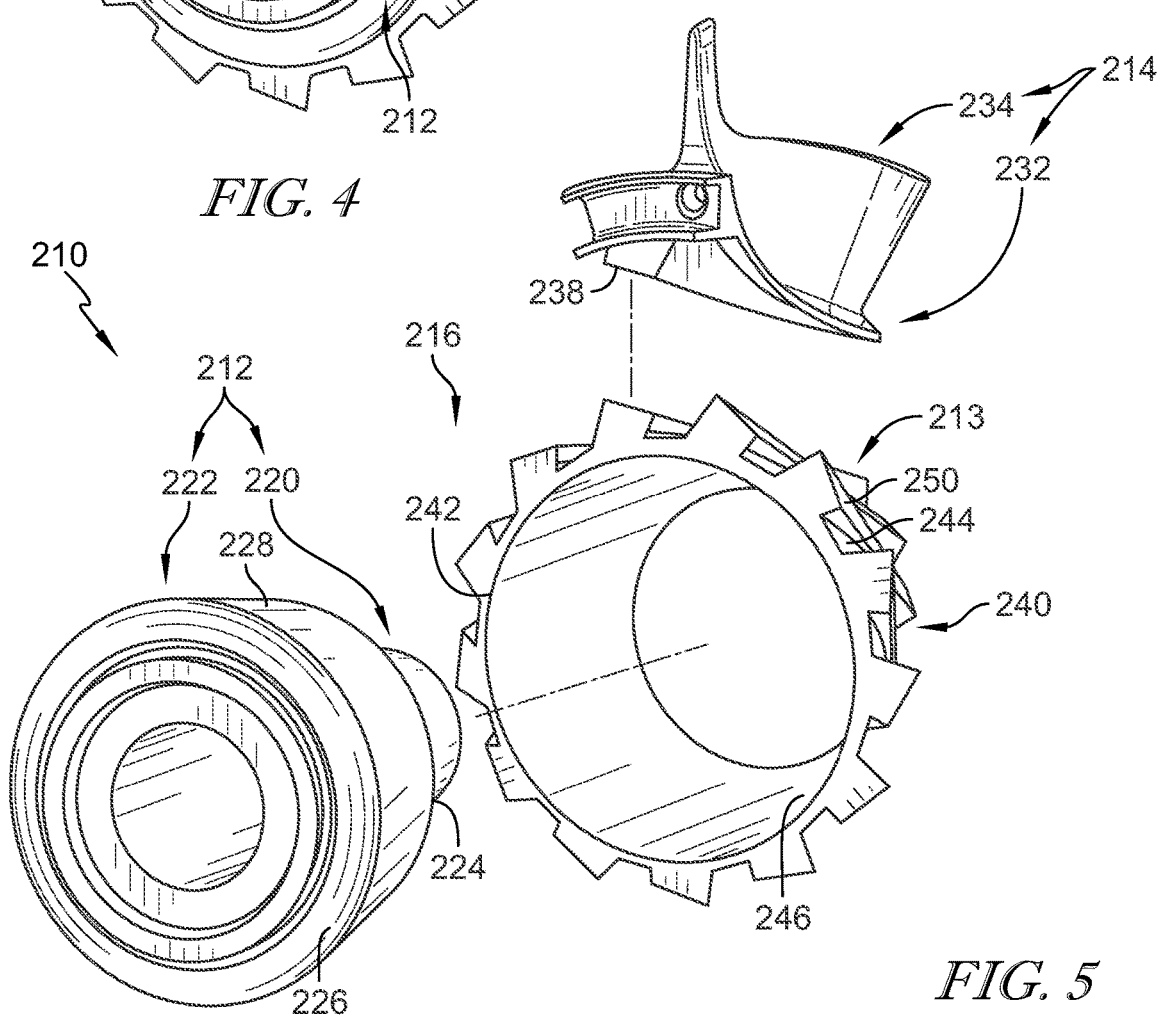
FIG. 5 is an exploded perspective assembly view of the radial turbine rotor of FIG. 4 showing the radial turbine rotor includes a hub, a turbine blade, and an intermediate ring formed to include protrusions extending radially outward from and circumferentially around the intermediate ring, and further showing that a platform portion of the turbine blade couples with a corresponding protrusion formed on the intermediate ring.

Another embodiment of a radial turbine rotor 210 in accordance with the present disclosure is shown in FIGS. 4 and 5. The radial turbine rotor 210 is substantially similar to the radial turbine rotor 10 shown in FIGS. 2 and 3 and described herein. Accordingly, similar reference numbers in the 200 series indicate features that are common between the radial turbine rotor 10 and the radial turbine rotor 210. The description of the radial turbine rotor 10 is incorporated by reference to apply to the radial turbine rotor 210, except in instances when it conflicts with the specific description and the drawings of the radial turbine rotor 210.

The radial turbine rotor 210 includes the hub 212, the plurality of turbine blades 214, and the intermediate ring 216, which are separate components that are assembled to form the radial turbine rotor 210 as suggested in FIG. 5. The multi-piece radial turbine rotor 210 allows for inspection of each component prior to assembly of the radial turbine rotor 210 so that the entire radial turbine rotor 210 may not be deemed unusable due to a defect in one component. Each component (i.e., the hub 212, each of the plurality of turbine blades 214, and the intermediate ring 216) may be inspected for defects prior to coupling the components together to form the radial turbine rotor 210, and defective components may be discarded.

The hub 212 is arranged around a central axis as shown in FIG. 4. As assembled, the hub 212 defines a radially-innermost surface of the radial turbine rotor 210. In the illustrative embodiment, the hub 212 includes a cylindrical portion 220 and a conical portion 222. The conical portion 222 of the hub 212 extends between a first end 24 and a second end 226. The first end 224 of the conical portion 222 is coupled with the cylindrical portion 220 of the hub 212.

In some embodiments, the hub 212 comprises nickel superalloy, such as, but not limited to, Udimet 720. In some embodiments, the hub 212 comprises nickel powder alloy, such as, but not limited to, RR1000. In some embodiments, the hub 212 comprises polycrystalline nickel-based superalloy, such as, but not limited to, Mar-M-247. In the illustrative embodiment, the hub 212 is integrally formed as a single component.

The plurality of turbine blades 214 are located radially outward of the hub 12 as shown in FIG. 4. The plurality of turbine blades 214 are circumferentially spaced apart from one another about the central axis. Each of the plurality of turbine blades 214 includes a platform portion 232 and an airfoil portion 234 located radially outward of the platform portion 232. Once assembled, the platform portion 232 of each of the plurality of turbine blades 214 is adjacent the intermediate ring 216, and the airfoil portion 234 of each of the plurality of turbine blades 214 extends radially outward into a gas path.

The platform portion 232 of each of the plurality of turbine blades 214 includes a radially-inwardly facing surface 238 as shown in FIG. 5. The radially-inwardly facing surface 238 is machined so that it is substantially flat and unblemished. The radially-inwardly facing surface 238 is generally free of protrusions or deposits of material.

At least one turbine blade 214 is formed to include a cooling air passageway 236 extending therethrough, as shown in FIG. 4, to cool the turbine blade 214 that is exposed to the hot working fluid flowing through the gas path. Cooling air travels radially outward from the hub 212 into the cooling air passageway 236 of the turbine blade 214. In some embodiments, each of the plurality of turbine blades 214 is cooled.

In some embodiments, each of the plurality of turbine blades 214 comprise metallic materials. For example, each of the plurality of turbine blades 214 may comprise polycrystalline nickel-based superalloy, such as, but not limited to, Mar-M-247. In some examples, each of the plurality of turbine blades 214 may comprise directionally solidified alloys, such as, but not limited to, CM186LC. In some examples, each of the plurality of turbine blades 214 may comprise single crystal alloys, such as, but not limited to CMSX-3 or CMSX-4. In some embodiments, each of the plurality of turbine blades 214 may be made through additive manufacturing and may comprise, for example, Haynes 282 alloy. In some embodiments, each of the plurality of turbine blades 214 may be made through additive manufacturing and may comprise a high temperature alloy. In some examples, each of the plurality of turbine blades 214 may be made through metal injection molding and may comprise Mar-M-247. In the illustrative embodiment, each of the plurality of turbine blades 214 is integrally formed as a single component.

The intermediate ring 216 extends circumferentially about the central axis as shown in FIG. 4. In the illustrative embodiment, the intermediate ring 216 is integrally formed as a single component. In some embodiments, the intermediate ring 216 comprises nickel superalloy, such as, but not limited to, Udimet 720. In some embodiments, the intermediate ring 216 comprises nickel powder alloy, such as, but not limited to, RR1000. In some embodiments, the intermediate ring 216 comprises polycrystalline nickel-based superalloy, such as, but not limited to, Mar-M-247.

As assembled, the intermediate ring 216 is located radially between the hub 212 and the plurality of turbine blades 214 as shown in FIG. 4. The intermediate ring 216 includes a first end 240 and a second end 242 opposite the first end 240. The first end 240 of the intermediate ring 216 is located adjacent the first end 224 of the conical portion 222 of the hub 212, and the second end 242 of the intermediate ring 216 is located adjacent the second end 226 of the conical portion 222 of the hub 212.

A radially-outwardly facing surface 244 of the intermediate ring 216 extends between the first end 240 and the second end 242 of the intermediate ring 216 as shown in FIG. 5. The intermediate ring 216 is formed to include a plurality of protrusions 213 extending radially outwardly away from the radially-outwardly facing surface 244. In the illustrative embodiment, the plurality of protrusions 213 extend entirely between the first end 240 and the second end 242 of the intermediate ring 216. The plurality of protrusions 213 are spaced apart circumferentially around the intermediate ring 216 such that each of the plurality of protrusions 213 is spaced apart from adjacent protrusions 213. The plurality of protrusions 213 wind around a portion of the intermediate ring 216 between the first end 240 and the second end 242.

A radially-outwardly facing surface 250 of each of the plurality of protrusions 213 is machined so that it is substantially flat and unblemished as shown in FIG. 5. The radially-outwardly facing surface 250 is generally free of protrusions or deposits of material. The radially-inwardly facing surface 238 of the platform portion 232 of each of the plurality of turbine blades 214 and the radially-outwardly facing surface 250 of each of the plurality of protrusions 213 have matching surface contours. The matching surface contours may be achieved through machining of both surfaces 238, 250.

Each of the plurality of turbine blades 214 is coupled with the intermediate ring 216 as shown in FIG. 4. The platform portion 232 of adjacent turbine blades 214 abut one another once fixed with the intermediate ring 216. The platform portion 232 of each of the plurality of turbine blades 214 extends from the first end 240 of the intermediate ring 216 to the second end 242 of the intermediate ring 216.

Each turbine blade 214 is fixed to the intermediate ring 216 by a blade joint 248 between the radially-inwardly facing surface 238 of the platform portion 232 of the turbine blade 214 and a corresponding radially-outwardly facing surface 250 of the protrusion 213. The blade joint 248 is formed between flat surfaces 238, 250, thereby allowing for a flat bondline geometry.

In some embodiments, the blade joint 248 is a diffusion bond joint. In some embodiments, the blade joint 248 is a braze joint. In some embodiments, the blade joint 248 may be any other joint that fixes the platform portion 232 of the turbine blade 214 with the intermediate ring 216. The matching surface contours of the surfaces 238, 250 allow for a strong blade joint 248 to be formed. In the illustrative embodiment, a number of the plurality of turbine blades 214 is equal to a number of the plurality of protrusions 213.

The blade joint 248 may be inspected to determine if the blade joint 248 has been sufficiently formed between each turbine blade 214 and the intermediate ring 216. Various inspection tools may be used to assess the quality of the blade joint 248, such as, but not limited to, an ultrasonic transducer, a magnification device, an eddy current sensor, and/or a flash thermography device.

The hub 212 fits within the intermediate ring 216 such that the conical portion 222 of the hub 212 is located radially inward of the intermediate ring 216 as shown in FIG. 4. The radially-outwardly facing surface 228 of the conical portion 222 of the hub 212 and a radially-inwardly facing surface 246 of the intermediate ring 216 have matching conical surfaces so that the hub 212 and the intermediate ring 216 may be fixed together. The matching conical surfaces may be achieved through machining of both surfaces 228, 246.

The hub 212 is fixed to the intermediate ring 216 by a hub joint 254 as shown in FIG. 4. The hub joint 254 is formed between the radially-outwardly facing surface 228 of the conical portion 222 of the hub 212 and the radially-inwardly facing surface 246 of the intermediate ring 216. In the illustrative embodiment, the hub joint 254 is a diffusion bond joint. In some embodiments, the hub joint 254 may be any other joint that fixes the hub 212 with the intermediate ring 216. The matching conical surfaces 228, 246 allow for a strong hub joint 254 to be formed.

In some embodiments, shrink fitting may be used as part of the process of forming the hub joint 254. A material containing a suitable melting point suppressant may be applied to the radially-outwardly facing surface 228 of the hub 212 and/or the radially-inwardly facing surface 246 of the intermediate ring 216. The hub 212 and the intermediate ring 216 may be shrink fit together by sufficiently heating the intermediate ring 216 and cooling the hub 212, resulting in thermal expansion of the intermediate ring 216. After the intermediate ring 216 has expanded, the hub 212 may be inserted into the intermediate ring 216. As the intermediate ring 216 and the hub 212 reach ambient temperature, the hub joint 254 may then be formed through, for example, diffusion bonding.

The hub joint 254 may be inspected to determine if the hub joint 254 has been sufficiently formed between the intermediate ring 216 and the hub 212. Various inspection tools may be used to assess the quality of the hub joint 254, such as, but not limited to, an ultrasonic transducer, a magnification device, an eddy current sensor, and/or a flash thermography device.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A radial turbine rotor, the rotor comprising:
    a hub arranged around a central axis that defines a radially-innermost surface of the rotor,
    a plurality of turbine blades located circumferentially outward of the hub, each of the plurality of turbine blades formed to include a platform portion and an airfoil portion radially outward of the platform portion, and
    an intermediate ring extending around the central axis and coupled with the hub and each of the plurality of turbine blades to locate the intermediate ring radially between the hub and each of the plurality of turbine blades, wherein the hub is fixed to the intermediate ring by a diffusion bond joint formed between a radially-outwardly facing surface of the hub and a radially-inwardly facing surface of the intermediate ring,
    wherein each of the plurality of turbine blades is fixed to the intermediate ring by a blade joint formed between each of the plurality of turbine blades and a radially-outwardly facing surface of the intermediate ring opposite the radially-inwardly facing surface of the intermediate ring, an entirety of the radially-outwardly facing surface of the intermediate ring being smooth and unblemished.

2. The rotor of claim 1, wherein the blade joint is a braze joint.

3. The rotor of claim 1, wherein the blade joint is formed between a radially-inwardly facing surface of the platform portion of each of the plurality of turbine blades and the radially-outwardly facing surface of the intermediate ring.

4. The rotor of claim 3, wherein the radially-outwardly facing surface of the intermediate ring and the radially-inwardly facing surface of the platform portion of each of the plurality of turbine blades have matching surface contours.

5. The rotor of claim 1, wherein the plurality of turbine blades comprises metallic materials.

6. A method of assembling a radial turbine rotor, the method comprising:
    manufacturing a plurality of turbine blades, each of the plurality of turbine blades formed to include a platform portion and an airfoil portion extending radially outward from the platform portion,
    manufacturing an intermediate ring that extends circumferentially about a central axis,
    machining a radially-outwardly facing surface of the intermediate ring so that the radially-outwardly facing surface is smooth and unblemished,
    manufacturing a hub that extends circumferentially about the central axis,
    fixing a radially-inwardly facing surface of the platform portion of each of the plurality of turbine blades to the intermediate ring by a blade joint to locate the plurality of turbine blades radially outward of the intermediate ring, and
    fixing a radially-inwardly facing surface of the intermediate ring to a radially-outwardly facing surface of the hub by a hub joint to locate the hub radially inward of the intermediate ring.

7. The method of claim 6, wherein the blade joint is a braze joint.

8. The method of claim 7, wherein the step of fixing the radially-inwardly facing surface of the platform portion of each of the plurality of turbine blades to the intermediate ring by a blade joint includes fixing the radially-inwardly facing surface of the platform portion of each of the plurality of turbine blades to the radially-outwardly facing surface of the intermediate ring.

9. The method of claim 8, further comprising machining the radially-outwardly facing surface of the intermediate ring and the radially-inwardly facing surface of the platform portion of each of the plurality of turbine blades to have matching surface contours.

10. The method of claim 6, further comprising machining the radially-inwardly facing surface of the intermediate ring and the radially-outwardly facing surface of the hub to form matching conical surfaces.

11. The method of claim 6, wherein the radially-outwardly facing surface of the intermediate ring is free of protrusions.

12. A radial turbine rotor, the rotor comprising:
a hub arranged around a central axis that defines a radially-innermost surface of the rotor,
a plurality of turbine blades located circumferentially outward of the hub, each of the plurality of turbine blades formed to include a platform portion and an airfoil portion radially outward of the platform portion, and
an intermediate ring extending around the central axis and coupled with the hub and each of the plurality of turbine blades to locate the intermediate ring radially between the hub and each of the plurality of turbine blades, wherein the hub is fixed to the intermediate ring by a diffusion bond joint formed between a radially-outwardly facing surface of the hub and a radially-inwardly facing surface of the intermediate ring,
wherein the intermediate ring is formed to include a plurality of protrusions extending radially outward from a radially-outwardly facing surface of the intermediate ring and axially along the radially-outwardly facing surface between a forward end of the intermediate ring and an aft end of the intermediate ring,
wherein a radially-inwardly facing surface of the platform portion of each of the plurality of turbine blades is flat and a radially-outwardly facing surface of each of the plurality of protrusions is flat.

13. The rotor of claim 12, wherein the plurality of protrusions are formed circumferentially around an entirety of the intermediate ring.

14. The rotor of claim 12, wherein each of the plurality of turbine blades is fixed to the intermediate ring by a blade joint formed between the radially-inwardly facing surface of the platform portion of each of the plurality of turbine blades and the radially-outwardly facing surface of each of the plurality of protrusions.

15. The rotor of claim 14, wherein the blade joint is a braze joint.

16. The rotor of claim 12, wherein a number of the plurality of turbine blades and a number of the plurality of protrusions are equal.

17. The rotor of claim 12, wherein an entirety of the radially-outwardly facing surface of each of the plurality of protrusions is flat.

18. The rotor of claim 12, wherein each of the plurality of protrusions includes a first circumferential wall extending outwardly from the radially-outwardly facing surface of the intermediate ring, a second circumferential wall spaced apart from the first circumferential wall and extending outwardly from the radially-outwardly facing surface of the intermediate ring, and an outer wall extending between and interconnecting the first circumferential wall and the second circumferential wall, the outer wall defining the radially-outwardly facing surface of the intermediate ring, and
wherein the first circumferential wall has a first height and the second circumferential wall has a second height less than the first height.

\* \* \* \* \*